(12) United States Patent
van Baal et al.

(10) Patent No.: US 6,355,723 B1
(45) Date of Patent: Mar. 12, 2002

(54) DARK COLORED THERMOPLASTIC COMPOSITIONS, ARTICLES MOLDED THEREFROM, AND ARTICLE PREPARATION METHODS

(75) Inventors: Harry van Baal, Goes (NL); Jenny Z. Bu, Newburgh, IN (US); Peter J. Codella, Niskayuna, NY (US); Robert R. Gallucci, Mt. Vernon, IN (US); Dennis A. Kopp, Newburg, IN (US); Martin J. Lindway, Newburgh, IN (US); James R. Wilson, Troy, MI (US)

(73) Assignee: General Electric Co., Pittsfield, PA (US)

( * ) Notice: Subject to any disclaimer, the term of this patent is extended or adjusted under 35 U.S.C. 154(b) by 0 days.

(21) Appl. No.: 09/599,659

(22) Filed: Jun. 22, 2000

(51) Int. Cl.$^7$ ............................................... C08L 77/00
(52) U.S. Cl. ....................................................... 524/602
(58) Field of Search ......................................... 524/602

(56) References Cited

U.S. PATENT DOCUMENTS

| 4,210,841 A | 7/1980 | Vodicka et al. |
| 4,569,005 A | 2/1986 | Bergin et al. |
| 4,569,006 A | 2/1986 | Bergin et al. |
| 4,623,958 A | 11/1986 | Van der Linde et al. |
| 5,045,344 A | 9/1991 | Pinkhasov |
| 5,378,284 A | 1/1995 | Geisler et al. |
| 5,503,934 A | 4/1996 | Maas et al. |
| 5,521,258 A | 5/1996 | Cooper et al. |
| 5,849,087 A | 12/1998 | Kloberdanz et al. |
| 5,997,136 A * | 12/1999 | Fujisawa et al. ............ 347/101 |

\* cited by examiner

*Primary Examiner*—Kriellion A. Sanders

(57) ABSTRACT

A molded article suitable for direct application of a reflective metal coating includes an amorphous thermoplastic or thermoplastic blend having a glass transition temperature greater than about 170° C. and at least one thermally stable colorant that contributes to the article's dark appearance. The article has excellent dimensional stability, and the surface to which a metal coating can be applied exhibits low gloss. Application of a metal coating to the molded article produces a metalized surface with high total reflectivity, low diffuse reflectivity, and low haze. Compositions and methods for forming the article are described.

29 Claims, No Drawings

DARK COLORED THERMOPLASTIC COMPOSITIONS, ARTICLES MOLDED THEREFROM, AND ARTICLE PREPARATION METHODS

BACKGROUND OF THE INVENTION

The present invention relates to thermoplastic molding compositions. In particular, the invention relates to colored thermoplastic compositions and articles molded therefrom.

Lighting reflectors, especially for automotive applications, require materials that can withstand the high heat produced by light sources, that have excellent dimensional stability to focus the light in a tight pattern at long distances, and that can be easily processed into complex shapes. These reflectors are usually coated with a metal, such as aluminum, to provide a highly reflective surface. To achieve this high degree of reflectivity with low haze, a very smooth pre-coated surface is required. In order to consistently achieve such a smooth pre-coated surface, it has typically been necessary to base coat the molded reflector with a primer prior to coating the reflector with metal. Efforts to simplify production of these metalized plastic articles by coating metal directly onto the molded reflector have resulted in intolerable waste because of difficulty identifying defective molded articles before the metal coating has been applied. The defective articles have surface blemishes that become noticeable only after a metal coating is applied, causing the parts to be discarded and creating an inefficient use of the coating equipment as well as loss of the thermoplastic resin. Direct metalization of molded parts is also challenging because it introduces the additional requirements of good adhesion of the metal to the molded part and a very smooth surface of the part as molded.

There is therefore a need for molded reflectors satisfying the simultaneous requirements of high temperature stability, high surface smoothness, good adhesion to metal coatings, and ready detectability of surface defects in the reflectors as molded, as well as high reflectivity, low haze, and low diffuse reflectivity after metalization.

BRIEF SUMMARY OF THE INVENTION

High temperature stability, high surface smoothness, good adhesion to metal coatings, and ready detectability of surface defects are provided by an article comprising: (a) a single phase amorphous thermoplastic resin or resin blend having a glass transition temperature ($T_g$) not less than about 170° C.; and (b) at least one colorant; wherein a surface of the article exhibits a CIE lightness value (L*) not greater than about 50, and a 20° gloss value per ASTM D523 not less than about 100.

DETAILED DESCRIPTION OF THE INVENTION

Molded articles suitable for direct metalization comprise: (a) a single phase amorphous thermoplastic resin or resin blend having a glass transition temperature ($T_g$) not less than about 170° C.; and (b) at least one colorant; wherein a surface of the article exhibits a CIE lightness value (L*) not greater than about 50, and a 20° gloss value per ASTM D523 not less than about 100. After metalization, a surface of the article exhibits a haze value not greater than about 1%, and a diffuse reflectivity not greater than about 1%.

We have discovered that to obtain a directly metalized article with high dimensional stability, a high degree of reflectivity, low diffuse reflectivity, and low haze, it is important that the article comprise a single phase amorphous polymeric resin or resin blend and be substantially free of solid particles and particle aggregates that can detract from the above properties. The use of single phase amorphous resins, rather than crystalline resins, improves the dimensional stability of the molded articles. Limiting the amounts of solid particles and particle aggregates is preferred to ensure high gloss in the article as molded, and low haze and low diffuse reflectivity after the article is metalized. While an unfilled, uncolored resin, like polyetherimide resin, can be directly metalized to give a low haze, high gloss surface that can withstand high heat, it is often difficult to detect blemishes on such transparent articles and discard blemished articles prior to metalization and coating operations. We have found that articles molded from dark thermoplastic resin compositions make surface blemishes, such as splay and shark skin, more noticeable in visual inspections. Thus, the use of dark compositions facilitates visual identification of blemishes prior to metalization, thereby reducing waste and expense. In addition, a partially metalized article may have transparent portions that allow some light to escape. This escaped light may interfere with focusing the light from such a lamp; for instance an unmetalized ring of transparent resin surrounding the bulb opening can create an undesired halo around the bulb. The dark compositions of the invention prevent this problem. We have also found that known opacifying techniques, such as the addition of standard colorants, like titanium dioxide or carbon black, and the addition of non-miscible polymers (such as polyolefins or polycarbonates), cause unacceptable losses of surface smoothness and gloss, and increased haze and diffuse reflectivity of the articles once metalized.

Single phase amorphous thermoplastic resins suitable for use in the articles include polyetherimides, polyarylethers, polyethersulfones, polysulfones, polycarbonates, polyestercarbonates, polyarylates, polyamides, polyesters, and single phase blends comprising at least one of the foregoing resins. The use of polyetherimides and single phase blends comprising polyetherimides, such as polyester polyetherimide blends, is presently preferred. The thermoplastic resin or resin blend has a glass transition temperature, $T_g$, greater than about 170° C., preferably greater than about 185° C., more preferably greater than about 200° C. The thermoplastic resins above are generally commercially available, and methods for their synthesis and blending are well known in the art.

While the proportion of thermoplastic resin or resin blend in the article may vary considerably, it is generally at least 80% by weight of the article. In a preferred embodiment, the thermoplastic resin or resin blend is present at about 90 to 99.99 weight percent, preferably about 95 to 99.99 weight percent, more preferably about 97 to 99.99 weight percent.

Synthetic colorants are typically derived from coal tar or petroleum intermediates. Colorants of many distinct types are available for use in plastics and coatings. The Color Index names many different chemical classes of colorants, including, for example, nitroso, nitro, mono azo, diazo, triazo, polyazo, azoic, stilbene, carotenoid, diphenylmethane, triarylmethane, xanthene, quinoline, acridine, methine, thiazole, indamine, indophenol, azine, oxazine, thiazine, sulfur, lactone, aminoketone, hydroxyketone, anthraquinone, indigloid, and phthalocyanine, as well as inorganic pigments. Colorants may be organic or inorganic, dyes or pigments.

Dyes are colorants that do not normally scatter light but absorb light at some visible wavelength. Dyes are often soluble, at some concentration, in the polymer matrix of a colored article. Pigments are organic or inorganic colorants that are usually present in a matrix as discrete particles insoluble in the matrix. The designation of a given colorant as pigment or dye will depend on the polymer matrix, colorant concentration and crystallinity, temperature, and other factors. Preferred colorants are soluble in the matrix resins at the concentrations employed to color the article.

Colorants suitable for use in the articles also generally exhibit high extinction coefficients and high thermal stability. High thermal stability is defined as the absence of significant color shift or thermal degradation when processed at temperatures of 250–350° C. required to form the articles of the invention from the resins indicated above. In addition, the colorants should not attack or degrade the resin resulting in an unacceptable loss of mechanical properties or generation of gaseous by-products during molding.

Suitable colorants having good thermal stability include those known under their Color Index numbers as solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 50, amino ketone black, solvent black 7, nigrosine dyes, disperse blue 73, solvent blue 97, solvent blue 101, solvent blue 104, solvent blue 138, disperse yellow 160, solvent yellow 84, solvent yellow 93, solvent yellow 98, solvent yellow 163, solvent yellow 160:1, and mixtures comprising at least one of the foregoing colorants. Preferred colorants include solvent red 135, solvent red 179, amino ketone black, solvent black 7, solvent violet 13, solvent violet 14, solvent violet 36, solvent violet 50, disperse blue 73, solvent yellow 93, solvent green 3, disperse yellow 160, and mixtures comprising at least one of the foregoing colorants.

Colorants are employed in amounts and combinations sufficient to render the molded article dark and opaque, and more specifically to provide the lightness values described below. The specific amount of a colorant employed will depend on, among other factors, its solubility and extinction coefficient in the thermoplastic matrix, and whether it is being employed in combination with one or more additional colorants. Suitable amounts and combinations are readily determined by those of ordinary skill in the art. Typical colorant amounts are about $1 \times 10^{-4}$ to about 5 parts per hundred parts resin by weight. Preferred colorant amounts are about $1 \times 10^{-4}$ to about 0.5 parts per hundred parts resin by weight.

The article may, optionally, also contain various additives known in the art, including phosphite antioxidants, such as, for example, tris(nonyl-phenyl) phosphite and tris(2,4-di-t-butylphenyl)phosphite; hindered phenol antioxidants, such as, for example, alkylated polyphenols, including, for example, tetra-cis(methylene)-3,5-di-t-butyl-4-hydroxycinnamate; and other additives such as, for example, UV absorbers, light stabilizers, lubricants, plasticizers, and anti-static agents.

It is preferred that the molded article be substantially free of particles that, individually or in aggregate form, would be detrimental to achieving the as molded values of 20° gloss, and the post-metalized values of reflectivity, haze and diffuse reflectivity, as detailed below. While authoritative determination of tolerable amounts and particle sizes of particulate components relies on the tests for gloss, reflectivity, haze, and diffuse reflectivity described herein, it has been observed that particulate components present at as little as 0.3 parts per hundred parts resin by weight and having particle sizes greater than about 13 nanometers may contribute to surface defects. It is therefore preferred that the article be substantially free of particles having any dimension greater than about 10 nanometers, preferably substantially free of particles having any dimension greater than about 5 nanometers. By substantially free, it is meant that particles having sizes exceeding the above limits should comprise no more than about 0.2 weight percent of the total article. It is preferred that particles having sizes exceeding the above limits should comprise no more than about 0.1 weight percent of the total article, and more preferred that particles having sizes exceeding the above limits should comprise no more than about 0.05 weight percent of the total article.

The level and type of particles, and aggregates of particles, which may be acceptable in the articles of the invention must be such that the as molded article and any metalized articles derived directly from it will have the 20° gloss, high reflectivity and low diffuse reflectivity described herein. The molded article possesses a surface having a CIE lightness value, L*, not greater than about 50, preferably not greater than about 40, more preferably not greater than about 35, yet more preferably not greater than about 31, and even more preferably not greater than about 30. The method of measuring L* values is described in R. McDonald, ed., "Colour Physics for Industry, $2^{nd}$ Edition", The Society of Dyers and Colourists, Bradford, UK (1997). Low lightness values, as specified above, correspond to a dark (e.g., black, gray or blue) appearance that facilitates visual inspection of molded parts for defects.

The molded article possesses a surface exhibiting a 20° gloss value per ASTM D523 of not less than about 100, preferably not less than about 110, more preferably not less than about 130. Such a high gloss surface in as molded articles is associated with high reflectivity, low diffuse reflectivity, and low haze after metalization.

The molded article may further comprise a metallic coating. The metal employed in the coating may include aluminum, silver, gold, nickel, palladium, platinum, copper, and alloys comprising at least one of the foregoing elements. Metal coatings comprising aluminum are presently preferred. Any known method for forming or adhering a metal coating on a thermoplastic substrate may be employed. Such methods include sputtering, vacuum metal deposition, vapor arc deposition, plasma chemical vapor deposition, thermal vapor metal deposition, and ion plating. Sputtering is a presently preferred method for forming or adhering a metal coating on the molded article.

Although the molded articles are well suited for direct application of a metal coating, it is also possible to pre-coat the molded article with a primer before applying the metal coating. It is also advantageous to further coat the metalized article with a clear layer to protect the metal surface from scratching, oxidation, or related problems. Silicone-derived clear coats, often deposited by plasma based silicone polymerization, are presently preferred.

The metalized surface of the article has a total reflectivity not less than about 85%, preferably not less than about 90%, more preferably not less than about 91%. The metalized surface also has a diffuse reflectivity not greater than about 1%. The metallized surface further has a haze value not greater than about 1%.

The compositions discussed herein can be prepared by a variety of melt blending techniques. Use of a vacuum vented single or twin screw extruder with a good mixing screw is preferred. In general, the melt processing temperature at which such an extruder should be run is about 100 to about 150° C. higher than the Tg of the thermoplastic. The mixture of ingredients may all be fed together at the throat of the extruder using individual feeders or as a mixtures. In some cases, for instance in blends of two or more resins, it may be advantageous first extrude a portion of the ingredients in a first extrusion and then add the remainder of the mixture in a second extrusion. It may be useful to first precompound the colorants into a concentrate which is subsequently mixed with the remainder of the resin composition. In other situations it may be beneficial to add portions of the mixture further down stream from the extruder throat. After extrusion the polymer melt is preferably stranded and cooled prior to chopping or dicing into pellets. Preferred pellets are about 1/16 to 1/8 inch long. The pelletized thermoplastic resins are then dried to remove water and molded into the articles of the invention. Drying at about 135 to about 150° C. for about 4 to about 8 hours is preferred, but drying times will vary with resin type. Injection molding is preferred using suitable temperature, pressures, and clamping to produce articles with a glossy surface. Melt temperatures for molding will be about 100° to about 200° C. above the resin Tg. Oil heated molds are preferred for higher Tg resins, Mold temperatures can range from about 50 to about 175° C. with temperatures of about 120° to about 175° C. preferred. Many variations of these compounding and molding conditions can be employed by those skilled in the art to make the compositions and articles of the invention.

The invention encompasses a method of preparing a reflective article, comprising: molding an article comprising (a) a single phase amorphous thermoplastic resin or resin blend having a glass transition temperature ($T_g$) not less than 170° C., and (b) at least one colorant, to form a molded article having a surface exhibiting a CIE lightness value (L*) not greater than 50, and a 20° gloss value per ASTM D523 not less than 90; and coating the surface of the molded article with a reflective metal to form a metalized surface having a haze value not greater than about 1% and a diffuse reflectivity not greater than about 1%.

The invention also encompasses a molded thermoplastic composition, comprising: (a) about 90 to 99.99 weight percent of a single phase amorphous thermoplastic resin or resin blend selected from the group consisting of polyetherimides, polyarylethers, polyethersulfones, polysulfones, polycarbonates, polyestercarbonates, polyarylates, polyamides, polyesters, and single phase blends comprising at least one of the foregoing resins, wherein the single phase amorphous thermoplastic resin or resin blend glass transition temperature $T_g$ not less than about 170° C.; and (b) about $1\times10^{-4}$ to about 5 weight percent of a colorant selected from the group consisting of solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 50, amino ketone black, solvent black 7, disperse blue 73, solvent blue 97, solvent blue 101, solvent blue 104, solvent blue 138, disperse yellow 160, solvent yellow 84, solvent yellow 93, solvent yellow 98, solvent yellow 163, solvent yellow 160:1, and mixtures comprising at least one of the foregoing colorants.

The invention is further illustrated by the following non-limiting examples.

EXAMPLE 1

Comparative formulations A–I and inventive formulations 1–2 were prepared using the compositions specified in Table 1. Amounts of all components are expressed as parts per hundred parts resin by weight (phr), where the total resin weight includes stabilizers, if present. Polyetherimide (PEI) resins were obtained from GE Plastics under the trademark ULTEM® as ULTEM® 1000 (number average molecular weight (Mn) 21,000; weight average molecular weight (Mw) 54,000; dispersity 2.5), ULTEM® 1010 (Mn 19,000; Mw 47,000; dispersity 2.5), and ULTEM® 1040 (Mn 12,000; Mw 34,000–35,000; dispersity 2.9) resins. Polyester carbonate (PCE) copolymer was prepared in a two-phase (methylene chloride/water) reaction of isophthaloyl and terephthaloyl diacidchloride with bisphenol A in the presence of base and a triethylamine phase transfer catalyst. Synthetic details for th is type of synthesis can be found in, for example, U.S. Pat. No. 5,521,258 at column 13, lines 15–45. The resulting polyester carbonate copolymer had 60% ester units (as a 1:1 weight/weight mixture of isophthalate and terephthalate units) and 40% carbonate units based on bisphenol A. Amino Ketone Black, an anthraquinone dye, was obtained as KEYPLAST AN black dye from Keystone Aniline Company; Pigment Black 6, a carbon black, was obtained from Columbian Carbon Co.under the trademark BLACK PEARLS® as BLACK PEARLS® 800 having particle sizes in the range 13–18 nanometers; Pigment White 6, a titanium dioxide ($TiO_2$), was obtained from Millennium as RCL 188 having a nominal average particle size of 200 nanometers; Pigment Red 178, an azo condensation product, was obtained from BASF under the trademark PALIOGEN® as PALIOGEN® Red K3911HD, having a nominal average particle size of 570 nanometers; Solvent Red 135, a perinone dye, was obtained from Bayer under the trademark MACROLEX® as MACROLEX® Red EG; Solvent Violet 36, an anthraquinone dye, was obtained from Bayer under the trademark MACROLEX® as MACROLEX® Violet 3R; Solvent Violet 13, an anthraquinone dye, was obtained from Bayer under the trademark MACROLEX® as MACROLEX® Violet B; Pigment Blue 15:4, a copper phthalocyanine, was obtained from BASF under the trademark HELIOGEN® as HELIOGEN® Blue K7100 having a nominal average particle size of 60 nanometers; Pigment Brown 24, a chromium/antimony/titanium metal oxide, was obtained from BASF under the trademark SICOTAN® as SICOTAN® Yellow K2107 having a nominal average particle size of 1,200 nanometers; Solvent Green 3, an anthroquinone dye, was obtained from Bayer, under the tradename MACROLEX® as MACROLEX® Green 5B; Solvent Yellow 93, an azo condensation product, was obtained from Bayer under the tradename MACROLEX® as MACROLEX® Yellow 3G. "Stabilizers" in Table 1 refers to a 1:1 weight/weight mixture of a hindered phenol stabilizer (obtained from Ciba Geigy under the trademark IRGANOX® as IRGANOX® 1010) and a triaryl phosphite stabilizer (obtained from Ciba Geigy under the trademark IRGAFOS® as IRGAFOS® 168).

Ingredients as specified in Table 1 were mixed together in a paint shaker and extruded at 575–640° F. at 80–90 rpm on a 2.5 inch vacuum vented single screw extruder. The resulting blends were pelletized and the pellets dried for 4 hours at 275° F. prior to injection molding into 5×7×1/8 inch plaques. The molding machine was set for a 675° F. melt temperature and a 275° F. mold temperature. Determinations of 20° gloss, CIE L* value, and appearance were performed for each sample as molded. Twenty degree gloss was measured according to ASTM D523 using a black tile standard. CIE lightness (L*) values were measured as described in R. McDonald (ed.), "Colour Physics for Industry, Second Edition" The Society of Dyers and Colourists, Bradford, UK (1997). Appearance refers to a subjective visual examination of the color and translucency/opacity of the as molded parts.

The samples where then metalized with about a 700 Angstrom layer of sputter coated aluminum, deposited using a Dynamet 4V instrument from Leybold Co. The samples were then further coated with 50–100 Angstrom of a hexamethyl disilazane derived plasma polymerized clear coat.

Reflectivity and diffuse reflectivity were measured on the metal coated surface of the metalized parts using a Perkin Elmer Lambda 19 UV/Visible/near infrared spectrophotometer equipped with a RSA-PE 18 reflectance Spectrometer obtained from Labsphere Co. The sample was compared to a Spectralon mirror standard. Total % reflectivity was measured at about 400 nanometers compared to the standard.

To measure diffuse reflectivity, which is a measure of scattered light, the directly reflected (specular) portion of the light was excluded from measurement by use of a light trap and the diffuse light content of the signal measured. Haze was measured on the metalized samples using a Pacific Gardner XL 835 calorimeter. The % light scattered from the metalized sample was compared to the directly reflected light. Haze measured in this manner correlated with the % diffuse reflectivity. Visual ranking was performed by a panel of 3–5 observers using a side by side comparison of all the metalized plaques using a subjective 9 point scale in which 1 corresponds to a surface completely free of defects and 9 corresponds to a hazy surface giving a very unclear, cloudy reflection.

Test values for % total reflectivity, % diffuse reflectivity, % haze and visual ranking (measured on metalized parts) and test values for lightness (L*), 20 degree gloss, and appearance (measured on unmetalized, as molded, parts) are presented in Table 2.

TABLE 1

| | Composition Identifier | | | | | | | | | | |
|---|---|---|---|---|---|---|---|---|---|---|---|
| Component | A | B | C | D | E | F | G | H | I | 1 | 2 |
| PEI-1000 | 100 | — | — | — | — | — | — | — | — | — | — |
| PEI-1010 | — | 100 | — | 100 | 99.7 | 100 | 100 | 15 | 25 | 100 | 100 |
| PEI-1040 | — | — | 100 | — | — | — | — | — | — | — | — |
| PCE (60% ester) | — | — | — | — | — | — | — | 84.8 | 74.8 | — | — |
| high density PE | — | — | — | — | 0.3 | — | — | — | — | — | — |
| $TiO_2$ | — | — | — | — | — | 3.03 | 3.09 | 1.46 | 1.52 | — | — |
| Pigment Black 6 | — | — | — | 0.3 | 0.3 | $2.9 \times 10^{-4}$ | — | 0.29 | 0.27 | — | — |
| Pigment Black 7 | — | — | — | — | — | — | $8.2 \times 10^{-3}$ | — | — | — | — |
| Pigment Red 178 | — | — | — | — | — | — | — | $3.1 \times 10^{-3}$ | $1.6 \times 10^{-3}$ | — | — |
| Solvent Red 135 | — | — | — | — | — | — | $4.1 \times 10^{-3}$ | — | — | $7.3 \times 10^{-2}$ | — |
| Solvent Violet 36 | — | — | — | — | — | $2.8 \times 10^{-3}$ | — | — | — | — | — |
| Solvent Violet 13 | — | — | — | — | — | $5.0 \times 10^{-4}$ | $8.8 \times 10^{-3}$ | — | — | $8.5 \times 10^{-2}$ | — |
| Pigment Blue 15:4 | — | — | — | — | — | — | — | $3.1 \times 10^{-2}$ | $2.3 \times 10^{-2}$ | — | — |
| Pigment Brown 24 | — | — | — | — | — | $4.9 \times 10^{-2}$ | $1.5 \times 10^{-1}$ | $1.1 \times 10^{-1}$ | $1.7 \times 10^{-2}$ | — | — |
| Solvent Green 3 | — | — | — | — | — | — | — | — | — | $6.8 \times 10^{-2}$ | — |
| Solvent Yellow 93 | — | — | — | — | — | — | — | — | — | $7.3 \times 10^{-2}$ | — |
| Amino Ketone Black | — | — | — | — | — | — | — | — | — | — | 0.3 |
| Stabilizers | — | — | — | — | — | — | — | 0.2 | 0.2 | — | — |

TABLE 2

| | Composition Identifier | | | | | | | | | | |
|---|---|---|---|---|---|---|---|---|---|---|---|
| | A | B | C | D | E | F | G | H | I | 1 | 2 |
| Properties of As Molded Surfaces | | | | | | | | | | | |
| Appearance | Brown Trans.* | Brown Trans. | Brown Trans. | Black Opaque | Black Opaque | White Opaque | Gray Opaque | Gray Opaque | Gray Opaque | Black Opaque | Black Opaque |
| L* Value | 82.4 | 78.5 | 58.3 | 30.4 | 31.8 | 83.2 | 68.6 | 35.0 | 30.4 | 30.2 | 30.4 |
| 20° Gloss as molded | 133 | 133 | 133 | 128 | 132 | 128 | 127 | 129 | 129 | 134 | 134 |
| Properties of Metalized Surfaces | | | | | | | | | | | |
| Total Reflectivity (%) | 91.8 | 91.7 | 91.3 | 91.0 | 93.3 | 92.7 | 92.0 | 91.1 | 91.1 | 91.3 | 91.4 |
| Diffuse Reflectivity (%) | 0.72 | 0.77 | 0.89 | 1.27 | 1.5 | 2.14 | 1.8 | 1.55 | 1.32 | 0.74 | 0.74 |
| Haze (%) | 0.3 | 0.7 | 0.8 | 1.5 | 1.6 | 1.8 | 2.2 | 1.6 | 1.3 | 0.5 | 0.6 |
| Visual Ranking | 1 | 2 | 3 | 5 | 7 | 9 | 8 | 6 | 4 | 1 | 1 |

*Trans. = Translucent

The results in Table 2 show that only formulations 1 and 2, representative of the invention, provided the combined attributes of opacity, low lightness (L* values of about 30), and high gloss (20° gloss values of 134) as molded, as well as excellent visual appearance (visual ranking values of 1), high reflectivity (total reflectivity greater than 90%), low diffuse reflectivity (not greater than about 0.8%), and low scattering (not greater than about 0.6%) after metalization. The comparison formulations generally exhibited inferior performance in one or more categories of diffuse reflectivity, scattering, lightness, or visual ranking. Comparative formulations D and E, containing 0.3 parts per hundred weight resin of pigment black 6 having 13–18 nanometer particles, exhibited elevated diffuse reflectivity and haze, and inferior visual ranking compared to inventive formulations 1 and 2. Comparative formulations F–I, containing various pigment components including 1.46 to 3.09 parts per hundred weight resin of titanium dioxide having 200 nanometer average particle size, also exhibited elevated diffuse reflectivity and haze and inferior visual ranking compared to inventive formulations 1 and 2. Although comparative formulations A, B and C exhibited high 20° gloss, low scattering and low diffuse reflectivity, their transparency would make it difficult to visually detect surface blemishes. Formulations 1 & 2, with black opaque surfaces, would make visualization of surface defects such as splay or shark skin easy to see without the increase of diffuse reflectivity and haze that was observed in opaque comparative formulations D-I. Formulation D, which included 0.3% of a carbon black with a nominal particle size of 17 micrometers, was associated with lower reflectivity (128), increased haze (1.5%), and increased diffuse reflectivity (1.27%) compared to inventive formulations 1 and 2. Similarly, opaque blends with titanium dioxide and other colorants (comparative formulations F–I), the non-miscible polymer high density polyethylene (comparative formulation E), and the non-miscible polymer polyester carbonate (comparative formulations H & I) exhibited inferior as molded and metalized surfaces.

EXAMPLE 2

Inventive formulations 1 and 2, above, were injection molded into concave, parabolic, automotive headlamp reflectors. A surface of these parts was sputter coated with aluminum and a clear coating was applied using the techniques described above. The parts were subsequently compared to metalized articles derived from formulations D and B. In contrast to the reflector molded from formulation D, the metalized reflectors of the examples of the invention exhibited a uniform bright reflective surface with very little scatter and haze. The black opaque parts made from the formulations 1 and 2 when metalized gave the same appearance as the metalized parts made from the transparent resin of formulation B, however, prior to metal coating, the presence of surface splay would have been much easier to see on the black opaque parts compared to the clear parts.

All cited patents and other references are incorporated herein by reference.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A molded article comprising:
    (a) a single phase amorphous thermoplastic resin or resin blend having a glass transition temperature not less than about 170° C.; and
    (b) at least one colorant; wherein a surface of the article exhibits a CIE lightness value not greater than about 50, and a 20° gloss value per ASTM D523 not less than about 100.

2. The article of claim 1, wherein the single phase amorphous thermoplastic resin or resin blend is selected from the group consisting of polyetherimides, polyarylethers, polyethersulfones, polysulfones, polycarbonates, polyestercarbonates, polyarylates, polyamides, polyesters, and single phase blends comprising at least one of the foregoing resins.

3. The article of claim 1, wherein the single phase amorphous thermoplastic resin or resin blend is selected from the group consisting of polyetherimides and single phase blends comprising polyesters and polyetherimides.

4. The article of claim 1, wherein the colorant is selected from the group consisting of solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 50, amino ketone black, solvent black 7, nigrosine dyes, disperse blue 73, solvent blue 97, solvent blue 101, solvent blue 104, solvent blue 138, disperse yellow 160, solvent yellow 84, solvent yellow 93, solvent yellow 98, solvent yellow 163, solvent yellow 160:1, and mixtures comprising at least one of the foregoing colorants.

5. The article of claim 1, wherein the colorant is selected from the group consisting of solvent red 135, solvent red 179, amino ketone black, solvent black 7, solvent violet 13, solvent violet 14, solvent violet 36, solvent violet 50, disperse blue 73, solvent yellow 93, solvent green 3, disperse yellow 160, and mixtures comprising at least one of the foregoing colorants.

6. The article of claim 1, wherein the single phase amorphous thermoplastic resin or resin blend has a glass transition temperature not less than about 185° C.

7. The article of claim 1, wherein the single phase amorphous thermoplastic resin or resin blend has a glass transition temperature not less than about 200° C.

8. The article of claim 1, wherein the surface of the article exhibits a CIE lightness value not greater than about 40.

9. The article of claim 1, wherein the surface of the article exhibits a CIE lightness value not greater than about 35.

10. The article of claim 1, wherein the surface of the article exhibits a CIE lightness value not greater than about 30.

11. The article of claim 1, wherein the surface of the article exhibits a 20° gloss value per ASTM D523 not less than about 110.

12. The article of claim 1, wherein the surface of the article exhibits a 20° gloss value per ASTM D523 not less than about 130.

13. The article of claim 1, further comprising a metal coating on the surface.

14. The article of claim 13, wherein the metal coating comprises aluminum.

15. The article of claim 13 wherein the metal coated surface has a diffuse reflectivity not greater than about 1%.

16. The article of claim 13 wherein the metal coated surface has a haze value not greater than about 1%.

17. A molded article comprising:
    (a) a single phase amorphous thermoplastic resin or resin blend having a glass transition temperature not less than about 170° C.; and
    (b) at least one colorant; wherein the article is substantially free of particulate matter; and wherein a surface of the article exhibits a CIE lightness value not greater than about 50, and a 20° gloss value per ASTM D523 not less than about 100.

18. A molded article comprising:
(a) a single phase amorphous thermoplastic resin or resin blend having a glass transition temperature not less than about 170° C.; and
(b) at least one colorant; wherein the article comprises no more than about 0.2 weight percent of particles having any dimension greater than about 10 nanometers; and wherein a surface of the article exhibits a CIE lightness value not greater than about 50, and a 20° gloss value per ASTM D523 not less than about 100.

19. A molded article comprising:
(a) about 80 to about 99.99 weight percent of a single phase amorphous thermoplastic resin or resin blend having a glass transition temperature not less than about 170° C.; and
(b) about 0.0001 to about 5 parts per hundred weight resin of at least one colorant; wherein a surface of the article exhibits a CIE lightness value not greater than about 50, and a 20° gloss value per ASTM D523 not less than about 100.

20. A molded article comprising:
(a) about 95 to 99.99 weight percent of a single phase amorphous thermoplastic resin or resin blend having a glass transition temperature not less than about 200° C.;
(b) about 0.0001 to about 0.5 parts per hundred weight resin of at least one colorant; and
(c) a metal coating on a surface of the molded article; wherein a surface of the article exhibits a CIE lightness value not greater than about 30; wherein the article comprises no more than about 0.2 weight percent of particles having any dimension greater than about 10 nanometers; and wherein the metal coated surface has a diffuse reflectivity not greater than about 1% and a haze value not greater than about 1%.

21. A metalized reflector comprising the article of claim 1.

22. An automobile headlight reflector comprising the article of claim 1.

23. A method of preparing a reflective article, comprising: molding an article comprising
(a) a single phase amorphous thermoplastic resin or resin blend having a glass transition temperature not less than about 170° C.; and
(b) at least one colorant, to form a molded article comprising a surface having a CIE lightness value not greater than 50 and a 20° gloss value per ASTM D523 not less than 100; and
coating the surface of the molded article with a reflective metal to form a metalized surface having a haze value not greater than about 1% and a diffuse reflectivity not greater than about 1%.

24. The method of claim 23, wherein coating the surface of the molded article with a reflective metal comprises at least one metal coating method selected from the group consisting of sputtering, vacuum metal deposition, vapor arc deposition, plasma chemical vapor deposition, thermal vapor metal deposition, and ion plating.

25. The method of claim 23, wherein the metal coating is applied directly to the molded article.

26. A molded thermoplastic composition, comprising:
(a) about 95 to 99.99 weight percent of a single phase amorphous thermoplastic resin or resin blend selected from the group consisting of polyetherimides, polyarylethers, polyethersulfones, polysulfones, polycarbonates, polyestercarbonates, polyarylates, polyamides, polyesters, and single phase blends comprising at least one of the foregoing resins; wherein the single phase amorphous thermoplastic resin or resin blend glass transition temperature $T_g$ not less than about 170° C.; and
(b) $1 \times 10^{-4}$ to about 5 weight percent of a colorant selected from the group consisting of solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 50, amino ketone black, solvent black 7, disperse blue 73, solvent blue 97, solvent blue 101, solvent blue 104, solvent blue 138, disperse yellow 160, solvent yellow 93, solvent yellow 98, solvent yellow 163, solvent yellow 160:1, and mixtures comprising at least one of the foregoing colorants.

27. The molded thermoplastic composition of claim 26, wherein the composition comprises no more than about 0.2 weight percent of particles having any dimension greater than about 10 nanometers.

28. A molded thermoplastic composition, comprising the reaction product of:
(a) 99.99 to about 95 weight percent of a single phase amorphous thermoplastic resin or resin blend selected from the group consisting of polyetherimides, polyarylethers, polyethersulfones, polysulfones, polycarbonates, polyestercarbonates, polyarylates, polyamides, polyesters, and single phase blends comprising at least one of the foregoing resins; wherein the single phase amorphous thermoplastic resin or resin blend glass transition temperature $T_g$ not less than about 170° C.; and
(b) $1 \times 10^{-4}$ to about 5 weight percent of a colorant selected from the group consisting of solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 50, pigment blue 29, amino ketone black, solvent black 7, disperse blue 73, solvent blue 97, solvent blue 101, solvent blue 104, solvent blue 138, pigment yellow 139, disperse yellow 160, solvent yellow 93, solvent yellow 98, solvent yellow 163, solvent yellow 160:1, and mixtures comprising at least one of the foregoing colorants.

29. The molded thermoplastic composition of claim 28, wherein the composition comprises no more than about 0.2 weight percent of particles having any dimension greater than about 10 nanometers.

* * * * *